(12) United States Patent
Brown

(10) Patent No.: US 11,665,273 B2
(45) Date of Patent: May 30, 2023

(54) SYSTEM AND METHOD FOR IMAGE COLOR MANAGEMENT

(71) Applicant: SAMSUNG ELECTRONICS CO., LTD., Suwon-si (KR)

(72) Inventor: Michael S. Brown, Toronto (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/906,207

(22) Filed: Jun. 19, 2020

(65) Prior Publication Data
US 2021/0278961 A1 Sep. 9, 2021

Related U.S. Application Data

(60) Provisional application No. 62/984,721, filed on Mar. 3, 2020.

(51) Int. Cl.
*G06F 3/04847* (2022.01)
*G06F 3/04886* (2022.01)
(Continued)

(52) U.S. Cl.
CPC .... *H04M 1/72403* (2021.01); *G06F 3/04842* (2013.01); *G06F 3/04845* (2013.01);
(Continued)

(58) Field of Classification Search
CPC ............ G06F 3/04847; G06F 3/04845; G06F 3/04842; H04M 1/72454; G06K 9/4652; G06K 9/46
See application file for complete search history.

(56) References Cited

U.S. PATENT DOCUMENTS

| 8,004,584 | B2 | 8/2011 | Craig et al. |
| 8,762,383 | B2 * | 6/2014 | Valencia-Campo ........................ G06K 9/6229 707/741 |

(Continued)

FOREIGN PATENT DOCUMENTS

| JP | H11-298848 A | 10/1999 |
| JP | 4435108 B2 | 3/2010 |

(Continued)

OTHER PUBLICATIONS

Will Knight, "The Dark Secret at the Heart of AI", May 18, 2017, MIT Technology Review, vol. 120, No. 3, pp. 54-63 (Year: 2017).*

(Continued)

*Primary Examiner* — Nicholas Klicos
(74) *Attorney, Agent, or Firm* — Sughrue Mion, PLLC

(57) ABSTRACT

A method for setting parameter settings of an image signal processor (ISP) of a camera of a mobile device based on a user selection may include controlling a display of the mobile device to display a plurality of images, each of which is associated with corresponding parameter settings. The method may include receiving, via a user interface (UI) of the mobile device, the user selection in relation to an image of the plurality of images. The method may include determining selected parameter settings based on the user selection in relation to the image. The method may include setting the parameter settings of the ISP, based on the selected parameter settings, to permit the ISP to process a raw image from an image sensor of the mobile device using the selected parameter settings.

20 Claims, 10 Drawing Sheets

(51) Int. Cl.

| | |
|---|---|
| *G06F 3/04842* | (2022.01) |
| *G06F 3/04845* | (2022.01) |
| *H04M 1/72403* | (2021.01) |
| *H04N 9/73* | (2023.01) |
| *H04M 1/72427* | (2021.01) |
| *H04M 1/72454* | (2021.01) |
| *G06F 18/00* | (2023.01) |
| *G06N 20/00* | (2019.01) |

(52) U.S. Cl.
CPC ...... *G06F 3/04847* (2013.01); *G06F 3/04886* (2013.01); *G06F 18/00* (2023.01); *H04M 1/72427* (2021.01); *H04M 1/72454* (2021.01); *H04N 9/73* (2013.01); *G06N 20/00* (2019.01)

(56) References Cited

U.S. PATENT DOCUMENTS

| | | | | |
|---|---|---|---|---|
| 9,734,565 | B2 | 8/2017 | Nakabayashi | |
| 11,222,413 | B2 | 1/2022 | Kim et al. | |
| 2003/0112357 | A1* | 6/2003 | Anderson | H04N 5/772 348/333.05 |
| 2004/0218065 | A1 | 11/2004 | Schinner | |
| 2006/0195475 | A1* | 8/2006 | Logan | G06F 16/58 |
| 2009/0047996 | A1* | 2/2009 | Lee | H04N 7/147 455/556.1 |
| 2009/0319897 | A1* | 12/2009 | Kotler | H04N 1/6013 715/838 |
| 2012/0081385 | A1* | 4/2012 | Cote | H04N 9/735 345/589 |
| 2012/0176401 | A1* | 7/2012 | Hayward | H04N 5/23216 345/619 |
| 2012/0321213 | A1* | 12/2012 | Crucs | G06T 5/00 382/262 |
| 2014/0285674 | A1 | 9/2014 | Takayama | |
| 2015/0199118 | A1* | 7/2015 | Berger | G06F 3/0482 715/838 |
| 2016/0286139 | A1* | 9/2016 | Tsuchiya | H04N 5/232935 |
| 2018/0322614 | A1* | 11/2018 | Petrova | G06T 5/002 |
| 2020/0401851 | A1* | 12/2020 | Mau | G06K 9/6292 |
| 2021/0405851 | A1* | 12/2021 | Wu | G06F 9/451 |

FOREIGN PATENT DOCUMENTS

| | | |
|---|---|---|
| JP | 2011-103548 A | 5/2011 |
| JP | 4947343 B2 | 6/2012 |
| JP | 2012-227744 A | 11/2012 |
| JP | 5077325 B2 | 11/2012 |
| KR | 10-2359391 B1 | 2/2022 |

OTHER PUBLICATIONS

Gil Press, "Cleaning Big Data: Most Time-Consuming, Least Enjoyable Data Science Task, Survey Says", Mar. 23, 2016, Forbes Online, <https://www.forbes.com/sites/gilpress/2016/03/23/data-preparation-most-time-consuming-least-enjoyable-data-science-task-survey-says/?sh=1a081d3b6f63>, pp. 1-6 (Year: 2016).*

Dhruv Sharma, "Problems in Machine Learning Models? Check your Data First", Aug. 30, 2019, towards data science, <https://towardsdatascience.com/problems-in-machine-learning-models-check-your-data-first-f6c2c88c5ec2>, pp. 1-8 (Year: 2019).*

DP Review, "Metering—Evaluative/Center weighted?", Jan. 23, 2005, retrieved on Feb. 2, 2023, retrieved from <https://www.dpreview.com/forums/thread/1107858>, pp. 1-11 (Year: 2005).*

International Search Report (PCT/ISA/210) and Written Opinion (PCT/ISA/237) dated Apr. 7, 2021 issued by the International Searching Authority in International Application No. PCT/KR2020/018996.

Triggs, "Why don't more manufacturers include camera color profiles?" Android Authority, Apr. 17, 2018, total 13 pages, https://www.androidauthority.com/smartphone-camera-color-profiles-855266/.

* cited by examiner

SYSTEM AND METHOD FOR IMAGE COLOR MANAGEMENT

CROSS-REFERENCE TO RELATED APPLICATION(S)

This application is based on and claims priority under 35 U.S.C. § 119 to U.S. Provisional Patent Application No. 62/984,721, filed on Mar. 3, 2020, in the U.S. Patent & Trademark Office, the disclosure of which is incorporated by reference herein in its entirety.

BACKGROUND

1. Field

The disclosure relates to setting parameter settings of an image signal processor (ISP) of a camera of a mobile device based on a user selection.

2. Description of Related Art

A mobile device may include a camera having an image sensor and an ISP. When a user of the mobile device uses the camera to capture an image of a scene, the image sensor may generate a raw image of the scene. The image sensor may provide the raw image in a raw image format to the ISP for processing. The ISP may process the raw image by performing image processing techniques, such as color manipulation, demosaicing, noise reduction, image sharpening, and the like. Further, the ISP may provide a processed image in a format such as Tagged Image File Format (TIFF), Joint Photographic Experts Group (JPEG), and the like. The processed image may be stored, transmitted, or processed further via post processing.

The ISP may be configured with parameter settings, and may process raw images from the image sensor in accordance with the parameter settings. A particular permutation of the parameter settings may be referred to as a "color profile." The visual appearance of the processed image may depend on the particular parameter settings of the ISP. Accordingly, ISPs that are configured with different parameter settings may generate processed images that include visually different appearances.

Typically, an ISP is preconfigured with particular and fixed parameter settings, which may vary based on geolocation. Accordingly, a user of a mobile device cannot adjust the fixed parameter settings of the ISP. In this way, the functionality and extensibility of the mobile device are inhibited, and the user experience is reduced.

Also, an ISP may include a large number of parameter settings. Accordingly, setting each of the parameter settings may be time-consuming, error-prone, and/or difficult for a user of the mobile device.

SUMMARY

To address the foregoing technical problems, embodiments of the present disclosure permit a user to set parameter settings of an ISP of a mobile device via a user interface (UI) of the mobile device. In this way, embodiments of the present disclosure provide customization of the parameter settings of an ISP based on a user selection, thereby improving the functionality and extensibility of the mobile device. Further, embodiments of the present disclosure permit the user to set the parameter settings by performing a user selection via the UI in relation to a set of displayed images that are associated with predefined parameter settings, thereby conserving processor and memory resources of the mobile device.

According to an aspect of an example embodiment, a method for setting parameter settings of an image signal processor (ISP) of a camera of a mobile device based on a user selection may include controlling a display of the mobile device to display a plurality of images, each of which is associated with corresponding parameter settings; receiving, via a user interface (UI) of the mobile device, the user selection in relation to an image of the plurality of images; determining selected parameter settings based on the user selection in relation to the image; and setting the parameter settings of the ISP, based on the selected parameter settings, to permit the ISP to process a raw image from an image sensor of the mobile device using the selected parameter settings.

According to an aspect of an example embodiment, a mobile device may include a memory configured to store instructions, and a processor configured to execute the instructions to control a display of the mobile device to display a plurality of images, each of which is associated with corresponding parameter settings; receive, via a user interface (UI) of the mobile device, a user selection in relation to an image of the plurality of images; determine selected parameter settings based on the user selection in relation to the image; and set parameter settings of an image signal processor (ISP) of a camera of the mobile device, based on the selected parameter settings, to permit the ISP to process a raw image from an image sensor of the mobile device using the selected parameter settings.

According to an aspect of an example embodiment, a non-transitory computer-readable medium may store instructions that, when executed by one or more processors of a mobile device, cause the one or more processors to control a display of the mobile device to display a plurality of images, each of which is associated with corresponding parameter settings; receive, via a user interface (UI) of the mobile device, a user selection in relation to an image of the plurality of images; determine selected parameter settings based on the user selection in relation to the image; and set parameter settings of an image signal processor (ISP) of a camera of the mobile device, based on the selected parameter settings, to permit the ISP to process a raw image from an image sensor of the mobile device using the selected parameter settings.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which.

DETAILED DESCRIPTION

The following detailed description of example embodiments refers to the accompanying drawings. The same reference numbers in different drawings may identify the same or similar elements.

Figure 1:
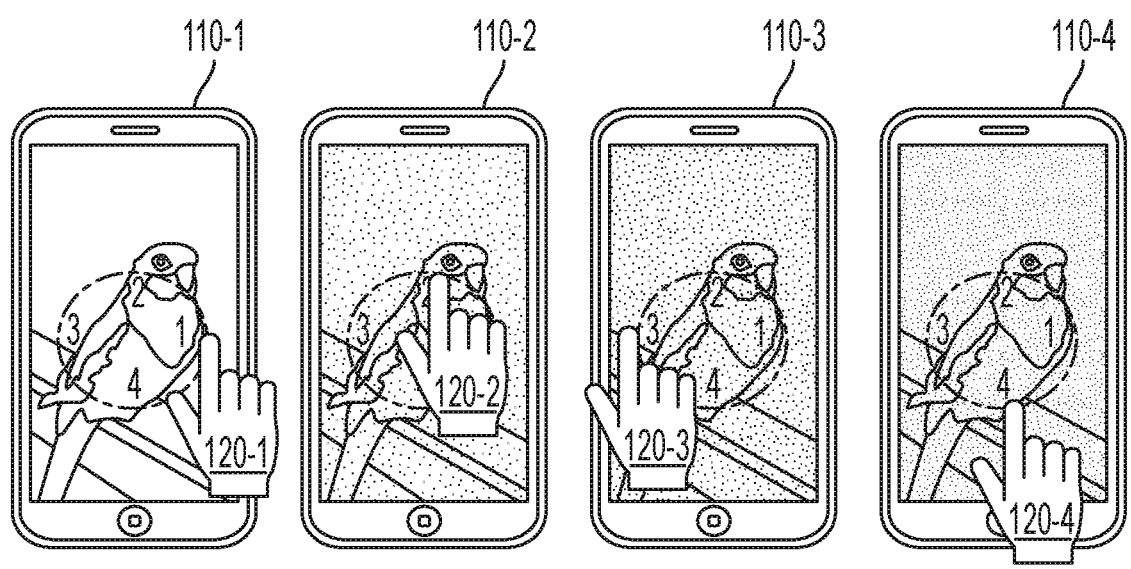
FIG. 1 is a diagram of an overview of a method for setting parameter settings of an ISP of a camera of a mobile device based on a user selection according to an embodiment.

FIG. 1 is a diagram of an overview of a method for setting parameter settings of an ISP of a camera of a mobile device based on a user selection according to an embodiment.

As shown in FIG. 1, a mobile device may display a plurality of images, each of which is associated with corresponding parameter settings. For example, the mobile device may display multiple versions of a same underlying image that are each respectively associated with different parameter settings of an ISP. In this way, a user may visually discern the differences between different parameter settings based on the respective visual appearances of the different versions of the image.

The mobile device may display a UI icon that permits the user to transition between the different images via touch gestures. For example, as shown, the mobile device may display a circular UI icon that includes four indicators (e.g., "1," "2," "3," and "4").

The mobile device may display a first image 110-1 that is associated with first parameter settings, based on the user performing a first touch gesture 120-1 in association with the first indicator ("1") of the circular UI icon. The first image 110-1 may visually depict how the first parameter settings affect the appearance of an image.

The mobile device may display a second image 110-2 that is associated with second parameter settings, based on the user performing a second touch gesture 120-2 such as by moving the user's finger in a counter-clockwise manner to the second indicator ("2"). The second image 110-2 may visually depict how the second parameter settings affect the appearance of an image.

The mobile device may display a third image 110-3 that is associated with third parameter settings, based on the user performing a third touch gesture 120-3 such as by moving the user's finger in a counter-clockwise manner to the third indicator ("3"). The third image 110-3 may visually depict how the third parameter settings affect the appearance of an image.

The mobile device may display a fourth image 110-4 that is associated with fourth parameter settings, based on the user performing a fourth touch gesture 120-4 such as by moving the user's finger in a counter-clockwise manner to the fourth indicator ("4"). The fourth image 110-4 may visually depict how the fourth parameter settings affect the appearance of an image.

In this way, the user may perform various touch gestures via the UI of the mobile device to transition between different versions of an image to discern how different parameter settings affect the appearance of the image.

The mobile device may receive, via a UI of the mobile device, a user selection in relation to an image of the plurality of images. As an example, assume that the user prefers the appearance of the first image 110-1 over the other images. In this case, the user may perform a touch gesture in association with the first image 110-1 to select the first image 110-1, such as by double-tapping the first image 110-1.

The mobile device may determine selected parameter settings based on the user selection in relation to the image. For example, the mobile device may determine the first parameter settings that are associated with the first image 110-1 as the selected parameter settings.

The mobile device may set the parameter settings of the ISP, based on the selected parameter settings, to permit the ISP to process a raw image from an image sensor of the mobile device using the selected parameter settings. For example, the mobile device may set the parameter settings of the ISP to the first parameter settings.

In this way, the ISP may process raw images from an image sensor of a camera of the mobile device using the first parameter settings. Accordingly, going forward, the mobile device may capture images that include visual appearances that align with a user preference.

Figure 2:
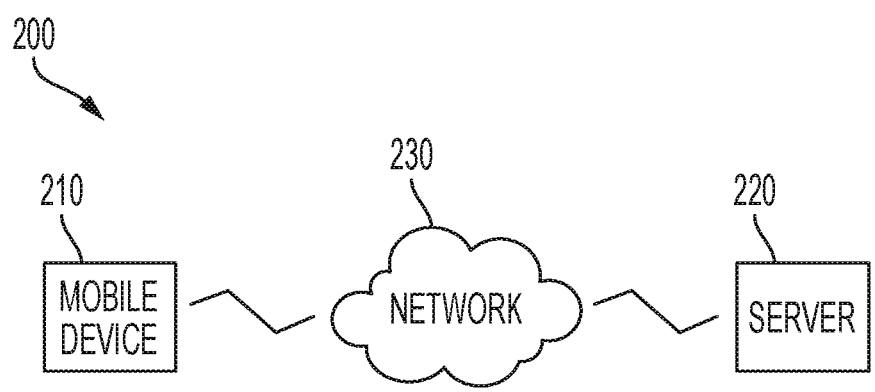
FIG. 2 is a diagram of a system for setting parameter settings of an ISP of a camera of a mobile device based on a user selection according to an embodiment.

FIG. 2 is a diagram of a system for setting parameter settings of an ISP of a camera of a mobile device based on a user selection according to an embodiment. As shown in FIG. 2, a system 200 may include a mobile device 210, a server 220, and a network 230.

The mobile device 210 may be a device configured to set parameter settings of an ISP of a camera of the mobile device 210 based on a user selection. For example, the mobile device 210 may include a smart phone, a tablet personal computer (PC), a mobile phone, a videophone, an e-book reader, a laptop PC, a netbook computer, a personal digital assistant (PDA), a portable multimedia player (PMP), an MP3 player, a wearable device, a smart watch, a camera device, and the like.

The server 220 may be a device configured to provide, to the mobile device 210, information associated with setting parameter settings of an ISP of a camera of the mobile device 210 based on a user selection. For example, the server 220 may be a server, a cloud server or a group of cloud servers, and the like.

The network 230 may include one or more wired and/or wireless networks. For example, the network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wireless LAN (WLAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Further, two or more devices shown in FIG. 2 may be implemented within a single device, or a single device shown in FIG. 2 may be implemented as multiple, distributed devices. A set of devices (e.g., one or more devices) of system 200 may perform one or more functions described as being performed by another set of devices of system 200.

Figure 3:
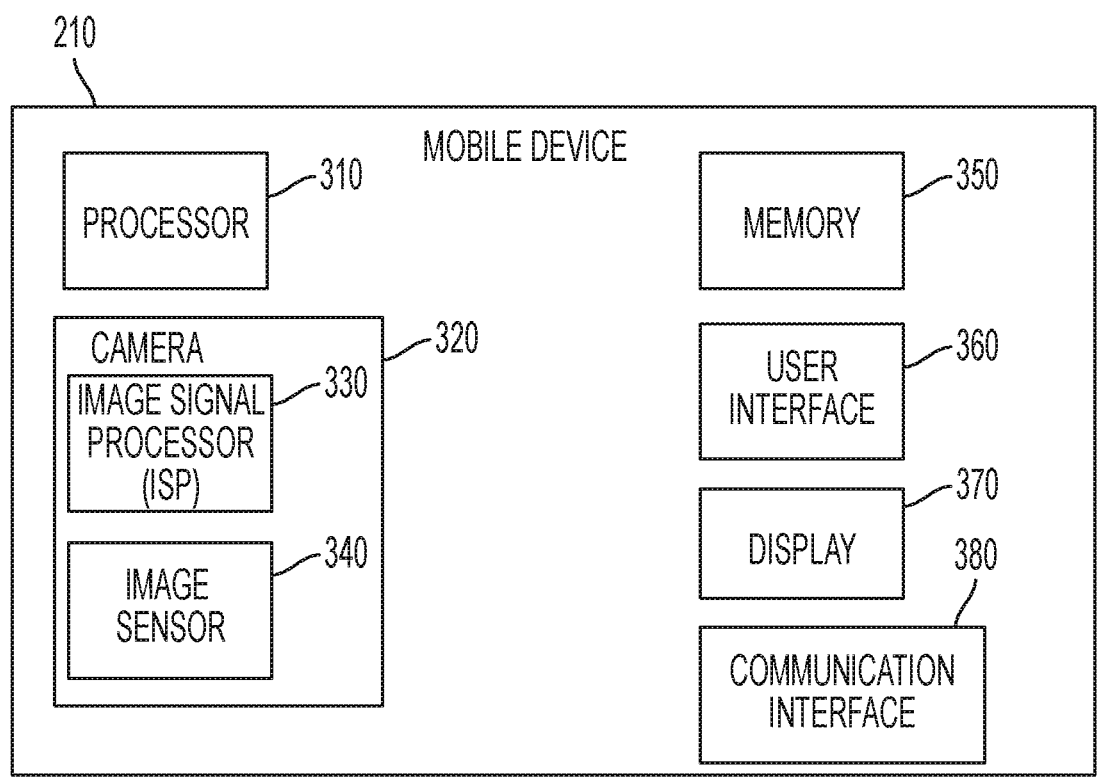
FIG. 3 is a diagram of components of a mobile device according to an embodiment.

FIG. 3 is a diagram of components of a mobile device according to an embodiment. As shown in FIG. 3, the mobile device 210 may include a processor 310, a camera 320 including an image signal processor (ISP) 330 and an image sensor 340, a memory 350, a user interface (UI) 360, a display 370, and a communication interface 380.

The processor 310 may be configured to set parameter settings of the ISP 330 of the camera 320 of the mobile device 210 based on a user selection received via the UI 360. For example, the processor 310 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and the like.

The camera 320 may be configured to capture an image of a scene. The camera 230 may include the ISP 330 and the image sensor 340. The image signal processor (ISP) 330 may be configured to process a raw image received from the image sensor 340 using a set of parameter settings. For example, the ISP 330 may be an ISP, an image processing engine, an image processing unit (IPU), an integrated signal processor, a processor, and the like. The image sensor 340 may be configured to generate a raw image. For example, the image sensor 340 may be a charge coupled device (CCD) or a complementary metal-oxide semiconductor (CMOS) sensor, and the like.

The parameter settings of the ISP 330 may be settings of parameters of the ISP 330 that control how the ISP 330 processes raw images. Collectively, the parameter settings may be referred to as a "color profile." For example, the ISP 330 may be configured with various parameters that may be associated with various settings. Accordingly, a particular combination of parameter settings may constitute a "color profile," and different permutations of parameter settings may constitute different "color profiles." The parameters may be, as examples, lens correction parameters, sensor value normalization parameters, white balance parameters, color space transform parameters, luma processing parameters, color processing parameters, local tone mapping parameters, multi-frame registration parameters, noise reduction parameters, filter parameters, and the like.

The memory 350 may be configured to store instructions that, when executed by the processor 310, cause the processor 310 to set parameter settings of the ISP 330 of the camera 320 of the mobile device 210 based on a user selection received via the UI 360. For example, the memory 350 may include a non-transitory computer-readable medium such as a flash memory type memory, a hard disk type memory, a multimedia card micro type memory, a card type memory (e.g., secure digital (SD) or extreme digital (XD) memory), a random access memory (RAM), a static random access memory (SRAM), read-only memory (ROM), electrically erasable programmable read-only memory (EEPROM), programmable read-only memory (PROM), a magnetic memory, a magnetic disk, an optical disc, and the like.

The user interface (UI) 360 may be configured to receive a user selection in relation to an image displayed via the display 370. For example, the UI 360 may be a touchscreen, a button, a dome switch, a keyboard, a keypad, a mouse, a switch, a microphone, a transceiver, a sensor, and the like.

The display 370 may be configured to display a plurality of images, each of which is associated with corresponding parameter settings. For example, the display 370 may be a liquid crystal display (LCD), an organic light-emitting diode (OLED) display, and the like.

The communication interface 380 may be configured to communicate with the server 220. For example, the communication interface 380 may be a cellular interface, a Bluetooth interface, a wireless fidelity (Wi-Fi) interface, a Wi-Fi Direct (WFD) interface, a Bluetooth Low Energy (BLE) interface, an Infrared Data Association (IrDA) interface, a Near Field Communication (NFC) interface, a laser communication network interface, a universal serial bus (USB) interface, and Ethernet interface, an optical interface, and the like.

The number and arrangement of components shown in FIG. 3 are provided as an example. In practice, the mobile device 210 may include additional components, fewer components, different components, or differently arranged components than those shown in FIG. 3. A set of components (e.g., one or more components) of the mobile device 210 may perform one or more functions described as being performed by another set of components of the mobile device 210.

Figure 4:
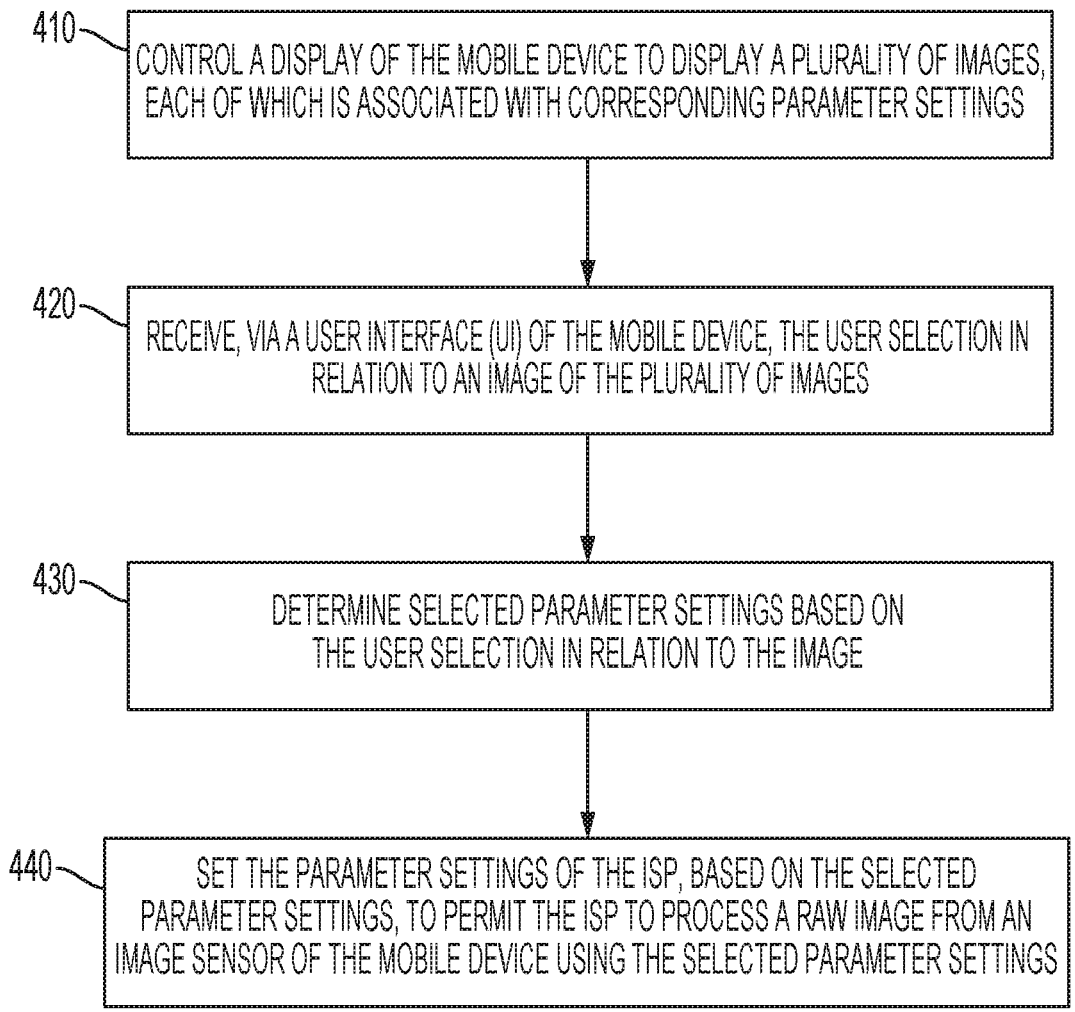
FIG. 4 is a diagram of a flowchart of a method for setting parameter settings of an ISP of a camera of a mobile device based on a user selection according to an embodiment.

FIG. 4 is a diagram of a flowchart of a method for setting parameter settings of an ISP of a camera of a mobile device based on a user selection according to an embodiment.

As shown in FIG. 4, the method may include controlling a display of the mobile device to display a plurality of images, each of which is associated with corresponding parameter settings (operation 410). For example, the processor 310 may control the display 370 of the mobile device 210 to display a plurality of images, each of which is associated with corresponding parameter settings.

The mobile device 210 may execute an application for setting parameter settings of the ISP 330 of the camera 320 of the mobile device 210. For example, the mobile device 210 may execute the application based on an initial set-up of the mobile device 210, based on a user request, based on a time frame, based on an update, and the like. The mobile device 210 may display a plurality of images, each of which is associated with corresponding parameter settings, based on executing the application for setting the parameter settings.

The mobile device 210 may display a predefined number n of images, such as two images, three images, four images, ten images, twelve images, etc. In this case, each of the n images may be associated with corresponding parameter settings, such that the user may select from, at least, n different parameter settings. For example, a first image may be associated with first parameter settings, a second image may be associated with second parameter settings, and an n-th image may be associated with n-th parameter settings, etc.

The mobile device 210 may display the plurality of images in a single screen. For example, the mobile device 210 may display the n images simultaneously. Alternatively, the mobile device 210 may display the plurality of images in a set of screens. For example, the mobile device 210 may display m images (e.g., where m<n) on a single screen.

The mobile device 210 may display different images based on a user input. For example, the user may interact with the UI 360 to transition between different images. As an example, and as shown in FIGS. 1, 5, 6, and 8, the user may interact with a circular UI icon to transition between the different images. Alternatively, the user may perform any type of touch gesture(s) to transition between the different images, such as via a swipe, a press, a drag, a flick, and the like.

The images may correspond to the same underlying image. That is, the images may be different versions of the same underlying image. In this way, the different images may depict the effects that different parameter settings have on the same underlying image. Further, in this way, the user may visually discern the effects of the different parameter settings. Alternatively, the images may be different from each other.

The mobile device 210 may display images corresponding to a category. A category may refer to a division or a class to which a set of entities, concepts, etc. having similar characteristics, appearances, qualities, attributes, etc. are grouped. For example, the category may be people, landscapes, food, indoors, outdoors, nature, architecture, time, location, season, weather, activity, and the like. The mobile device 210 may be configured to set parameter settings of the ISP 330 for a set of categories. Although particular examples of categories are used herein, it should be understood that the embodiments of the present disclosure are applicable to any types of categories.

The mobile device 210 may determine particular images to be displayed. For example, the mobile device 210 may determine an image(s) to be displayed from a set of images. The mobile device 210 may be configured with the set of images, and/or may receive the set of images from the server 220.

The mobile device 210 may determine an image to be displayed based on a category for which the parameter settings are being set. For example, if the category is "food," then the mobile device 210 may determine images of food from the set of images, and display the images of food.

Further, the mobile device 210 may determine particular images to be displayed based on the different parameter settings from which the user may select, and based on characteristics of the images. In this way, the mobile device 210 may select particular images that permit the user to visually discern the differences and effects of the parameter settings.

In this way, the mobile device 210 may display a plurality of images to permit the user to perform a user selection in relation to an image, as described below.

As further shown in FIG. 4, the method may include receiving, via a user interface (UI) of the mobile device, the user selection in relation to an image of the plurality of images (operation 420). For example, the processor 310 may receive, via the UI 360 of the mobile device 210, the user selection in relation to an image of the plurality of images.

The mobile device 210 may receive the user selection based on a user input. For example, the user may perform a touch gesture in relation to an image, and the mobile device 210 may receive the user selection based on the touch gesture. Alternatively, the user may interact with an input component of the mobile device 210, and the mobile device 210 may receive the user selection via the input component.

In this way, the mobile device 210 may receive the user selection, and determine selected parameter settings, as described below.

As further shown in FIG. 4, the method may include determining selected parameter settings based on the user selection in relation to the image (operation 430). For example, the processor 310 may determine selected parameter settings based on the user selection in relation to the image.

The mobile device 210 may determine selected parameter settings based on a user selection of a particular image of the displayed images. For example, if the user selects a first image that is associated with first parameter settings, then the mobile device 210 may determine the selected parameter settings as the first parameter settings.

Additionally, or alternatively, the mobile device 210 may determine selected parameter settings based on a user selection that selects an image and adjusts the parameter settings of the selected image. For example, the user may select a first image having first parameter settings, and may interact with the UI 360 to adjust the first parameter settings. As an example, the user may interact with a slider to adjust the first parameter settings. In this case, the mobile device 210 may determine the selected parameter settings as the adjusted first parameter settings.

Alternatively, the mobile device 210 may determine selected parameter settings based on a plurality of user selections of a plurality of images. For example, the mobile device 210 may display images, and the user may perform n user selections in relation to the images. The mobile device 210 may determine the selected parameter settings based on the n user selections.

For example, the mobile device 210 may determine selected parameter settings based on particular parameter settings that are chosen most by the user. As an example, if the user performs ten user selections, and six of the user selections select images that are associated with third parameter settings, then the mobile device 210 may determine the selected parameter settings as the third parameter settings.

Alternatively, the mobile device 210 may determine the selected parameter settings based on multiple parameter settings that are chosen by the user. For example, if the user selects images that are associated with different parameter settings, but include some common settings, then the mobile device 210 may determine selected parameter settings based on the common settings.

The mobile device 210 may determine the selected parameter settings based on a position of a user selection in relation to the plurality of images. For example, the mobile device 210 may determine a distance of a position of the user selection from a position of a displayed image, and determine the selected parameter settings based on the distance. As an example, and as described in more detail in FIG. 9, the mobile device 210 may determine selected parameter settings based on respective distances of the displayed plurality of images from a position of a user selection.

The mobile device 210 may determine the selected parameter settings based on mapping information that maps images and corresponding parameter settings. For example, the mapping information may map a first image with first parameter settings, may map a second image with second parameter settings, may map an n-th image with n-th parameter settings, etc. The mobile device 210 may be configured with the mapping information, and/or may receive the mapping information from the server 220.

In this way, the mobile device 210 may determine selected parameter settings, and may set the parameter settings of the ISP 330 based on the selected parameter settings.

As further shown in FIG. 4, the method may include setting the parameter settings of the ISP, based on the selected parameter settings, to permit the ISP to process a raw image from an image sensor of the mobile device using the selected parameter settings (operation 440). For example, the processor 310 may set the parameter settings of the ISP 330, based on the selected parameter settings, to permit the ISP 330 to process a raw image from an image sensor 340 of the mobile device 210 using the selected parameter settings.

The mobile device 210 may set the parameter settings of the ISP 330 for all images to be captured by the camera 320. For example, the mobile device 210 may set the parameter settings of the ISP 330 to a single set of parameter settings.

Figure 5:
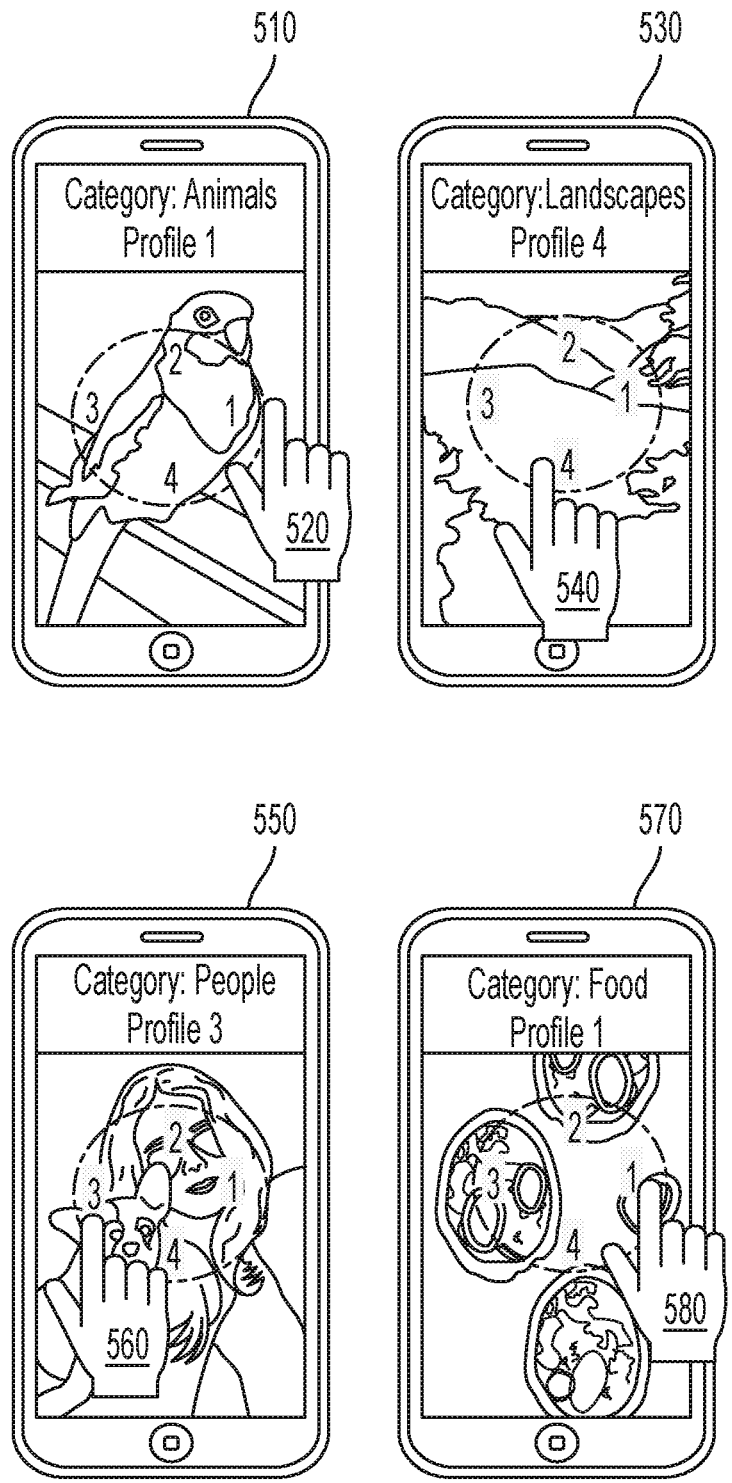
FIG. 5 is a diagram of a method for setting parameter settings of an ISP for different categories of images according to an embodiment.

Alternatively, and as shown in FIG. 5, the mobile device 210 may set the parameter settings of the ISP 330 for a particular category of images. For example, the mobile device 210 may set the parameter settings of the ISP 330 to a first set of parameter settings for a first category (e.g., food), may set the parameter settings of the ISP 330 to a second set of parameter settings for a second category (e.g., landscapes), may set the parameter settings of the ISP 330 to an n-th set of parameter settings for an n-th category (e.g., people), and the like.

Figure 6:
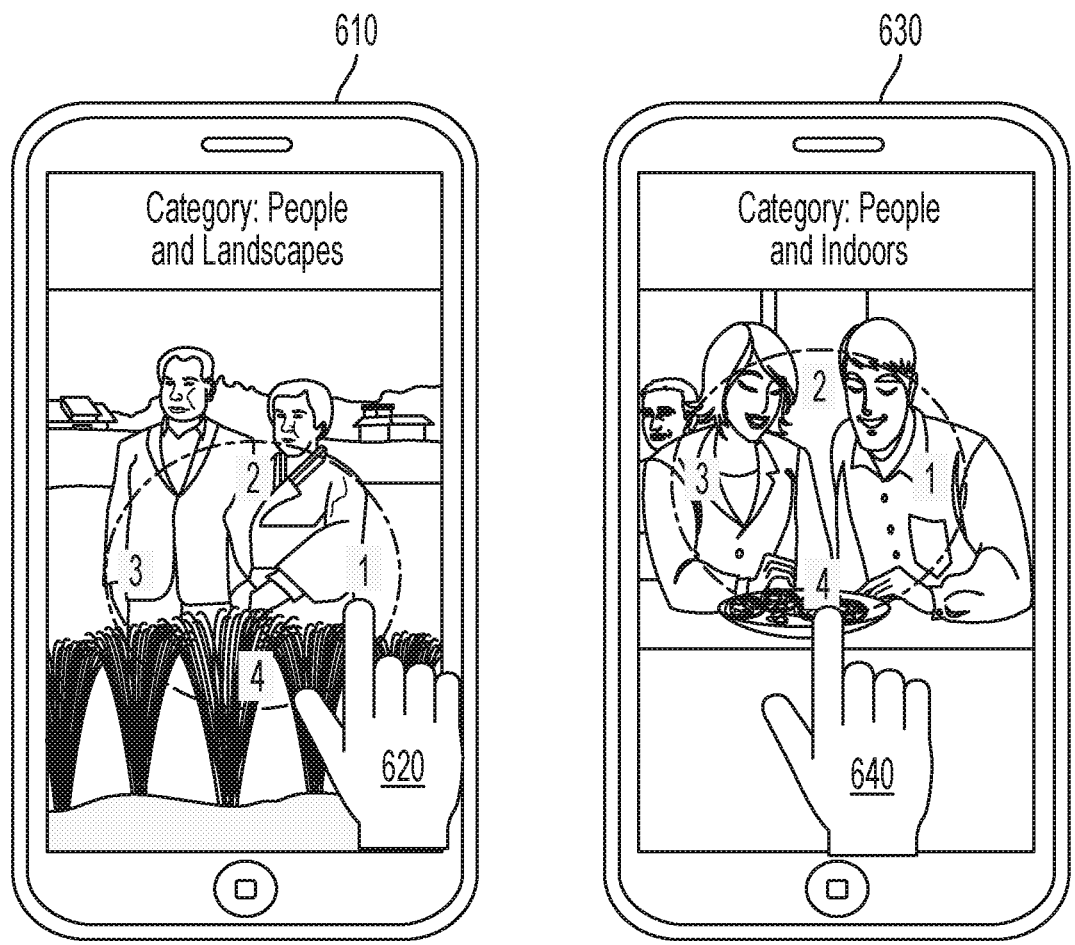
FIG. 6 is a diagram of a method for setting parameter settings of an ISP for different combinations of categories of images according to an embodiment.

Alternatively, and as shown in FIG. 6, the mobile device 210 may set the parameter settings of the ISP 330 for a combination of categories (e.g., people and food, people and landscapes, people and indoors, etc.).

In this way, the mobile device 210 may set the parameter settings of the ISP 330 to permit the ISP 330 to process raw images from the image sensor 340 using the set parameter settings.

Further, in this way, embodiments of the present disclosure provide customization of the parameter settings of the ISP 330 based on a user selection, thereby improving the functionality and extensibility of the mobile device 210. Further, embodiments of the present disclosure permit the user to set the parameter settings by performing a user selection via the UI 360 in relation to a set of displayed images that are associated with predefined parameter settings, thereby conserving processor 310 and memory 350 resources of the mobile device 210.

Although FIG. 4 shows example operations, in some implementations, the method may include additional operations, fewer operations, different operations, or differently arranged operations than those depicted in FIG. 4. Additionally, or alternatively, two or more of the operations may be performed in parallel.

FIG. 5 is a diagram of a method for setting parameter settings of an ISP for different categories of images according to an embodiment. The processor 310 of the mobile device 210 may be configured to set parameter settings of the ISP 330 for a set of categories of images.

As shown in FIG. 5, the processor 310 may control the display 370 to display images corresponding to a first category ("Animals"). The processor 310 may receive, via the UI 360, a user selection 520 in relation to an image 510 that corresponds to first parameter settings (e.g., "Profile 1"). The processor 310 may determine selected parameter settings (e.g., first parameter settings corresponding to "Profile 1") based on the user selection 520 in relation to the image 510. The processor 310 may set the parameter settings of the ISP 330, based on the selected parameter settings, to permit the ISP 330 to process raw images corresponding to the first category ("Animals") from the image sensor 340 using the selected parameter settings.

As further shown in FIG. 5, the processor 310 may control the display 370 to display images corresponding to a second category ("Landscapes"). The processor 310 may receive, via the UI 360, a user selection 540 in relation to an image 530 that corresponds to fourth parameter settings (e.g., "Profile 4"). The processor 310 may determine selected parameter settings (e.g., fourth parameter settings corresponding to "Profile 4") based on the user selection 540 in relation to the image 530. The processor 310 may set the parameter settings of the ISP 330, based on the selected parameter settings, to permit the ISP 330 to process raw images corresponding to the category ("Landscapes") from the image sensor 340 using the selected parameter settings.

As further shown in FIG. 5, the processor 310 may control the display 370 to display images corresponding to a third category ("People"). The processor 310 may receive, via the UI 360, a user selection 560 in relation to an image 550 that corresponds to third parameter settings (e.g., "Profile 3"). The processor 310 may determine selected parameter settings (e.g., third parameter settings corresponding to "Profile 3") based on the user selection 560 in relation to the image 550. The processor 310 may set the parameter settings of the ISP 330, based on the selected parameter settings, to permit the ISP 330 to process raw images corresponding to the third category ("People") from the image sensor 340 using the selected parameter settings.

As further shown in FIG. 5, the processor 310 may control the display 370 to display images corresponding to a fourth category ("Food"). The processor 310 may receive, via the UI 360, a user selection 580 in relation to an image 570 that corresponds to first parameter settings (e.g., "Profile 1"). The processor 310 may determine selected parameter settings (e.g., first parameter settings corresponding to "Profile 1") based on the user selection 580 in relation to the image 570. The processor 310 may set the parameter settings of the ISP 330, based on the selected parameter settings, to permit the ISP 330 to process raw images corresponding to the fourth category ("Food") from the image sensor 340 using the selected parameter settings.

In this way, the user may set different (or the same) parameter settings for different categories of images.

FIG. 6 is a diagram of a method for setting parameter settings of an ISP for different combinations of categories of images according to an embodiment. The processor 310 of the mobile device 210 may be configured to set parameter settings of the ISP 330 for combinations of categories of images.

As shown in FIG. 6, the processor 310 may control the display 370 to display images corresponding to a first combination of categories ("People and Landscapes"). The processor 310 may receive, via the UI 360, a user selection 620 in relation to an image 610 that corresponds to first parameter settings (e.g., "Profile 1"). The processor 310 may determine selected parameter settings (e.g., first parameter settings corresponding to "Profile 1") based on the user selection 620 in relation to the image 610. The processor 310 may set the parameter settings of the ISP 330, based on the selected parameter settings, to permit the ISP 330 to process raw images corresponding to the first combination of categories ("People and Landscapes") from the image sensor 340 using the selected parameter settings.

As further shown in FIG. 6, the processor 310 may control the display 370 to display images corresponding to a second combination of categories ("People and Indoors"). The processor 310 may receive, via the UI 360, a user selection 640 in relation to an image 630 that corresponds to fourth parameter settings (e.g., "Profile 4"). The processor 310 may determine selected parameter settings (e.g., fourth parameter settings corresponding to "Profile 4") based on the user selection 640 in relation to the image 630. The processor 310 may set the parameter settings of the ISP 330, based on the selected parameter settings, to permit the ISP 330 to process raw images corresponding to the second combination of categories ("People and Indoors") from the image sensor 340 using the selected parameter settings.

In this way, the user may set different (or the same) parameter settings for different combinations of categories of images.

Figure 7:
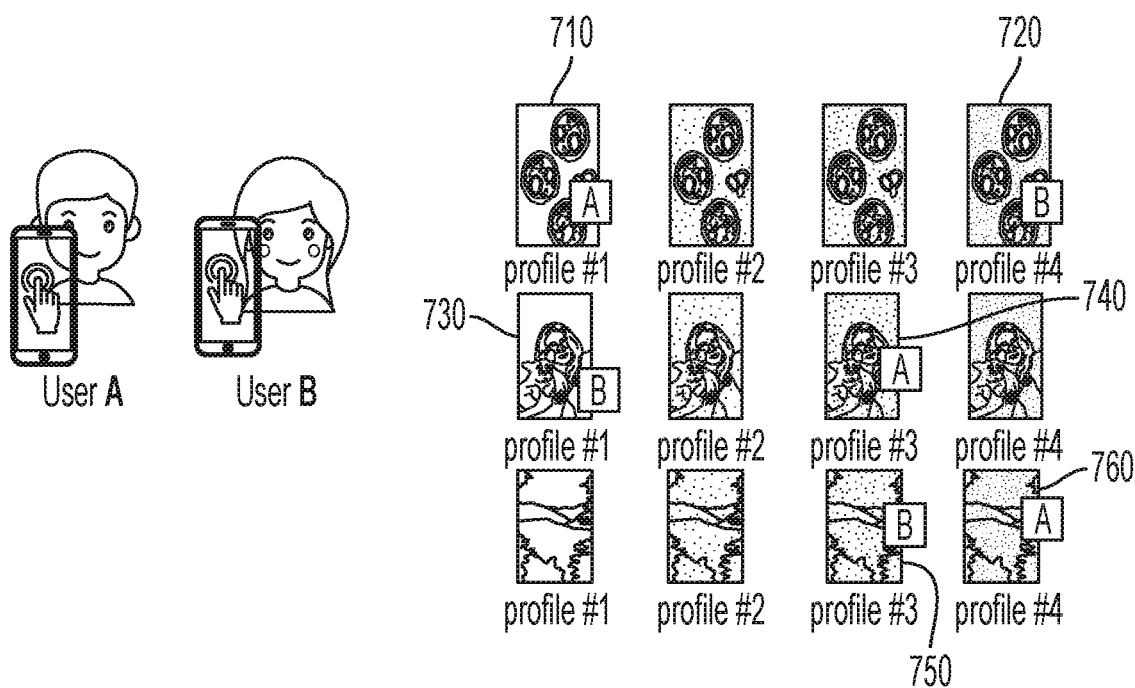
FIG. 7 is a diagram of a method for setting parameter settings of an ISP for different users of a mobile device according to an embodiment.

FIG. 7 is a diagram of a method for setting parameter settings of an ISP for different users of a mobile device according to an embodiment.

As shown in FIG. 7, a first user ("User A") of the mobile device 210 may provide a user selection 710 in relation to an image of a first category of images, provide a user selection 740 in relation to an image of a second category of images, and provide a user selection 760 in relation to an image of a third category of images. Accordingly, the processor 310 may set the parameter settings of the ISP 330 to the first parameter settings (e.g., "Profile 1") for the first category of images, set the parameter settings to the third parameter settings (e.g., "Profile 3") for the second category of images, and set the parameter settings to the fourth parameter settings (e.g., "Profile 4") for the third category of images, based on the user selections 710, 740, and 760, respectively.

As further shown in FIG. 7, a second user ("User B") of the mobile device 210 may provide a user selection 720 in relation to an image of a first category of images, provide a user selection 730 in relation to an image of a second category of images, and provide a user selection 750 in relation to an image of a third category of images. Accordingly, the processor 310 may set the parameter settings of the ISP 330 to the fourth parameter settings (e.g., "Profile 4") for the first category of images, set the parameter settings to the first parameter settings (e.g., "Profile 1") for the second category of images, and set the parameter settings to the third parameter settings (e.g., "Profile 3") for the third category of images, based on the user selections 720, 730, and 750, respectively.

In this way, different users of a mobile device 210 may select different parameter settings for the ISP 330. Accordingly, the mobile device 210 may generate images based on the respective settings of the ISP 330 for the respective users.

Figure 8:
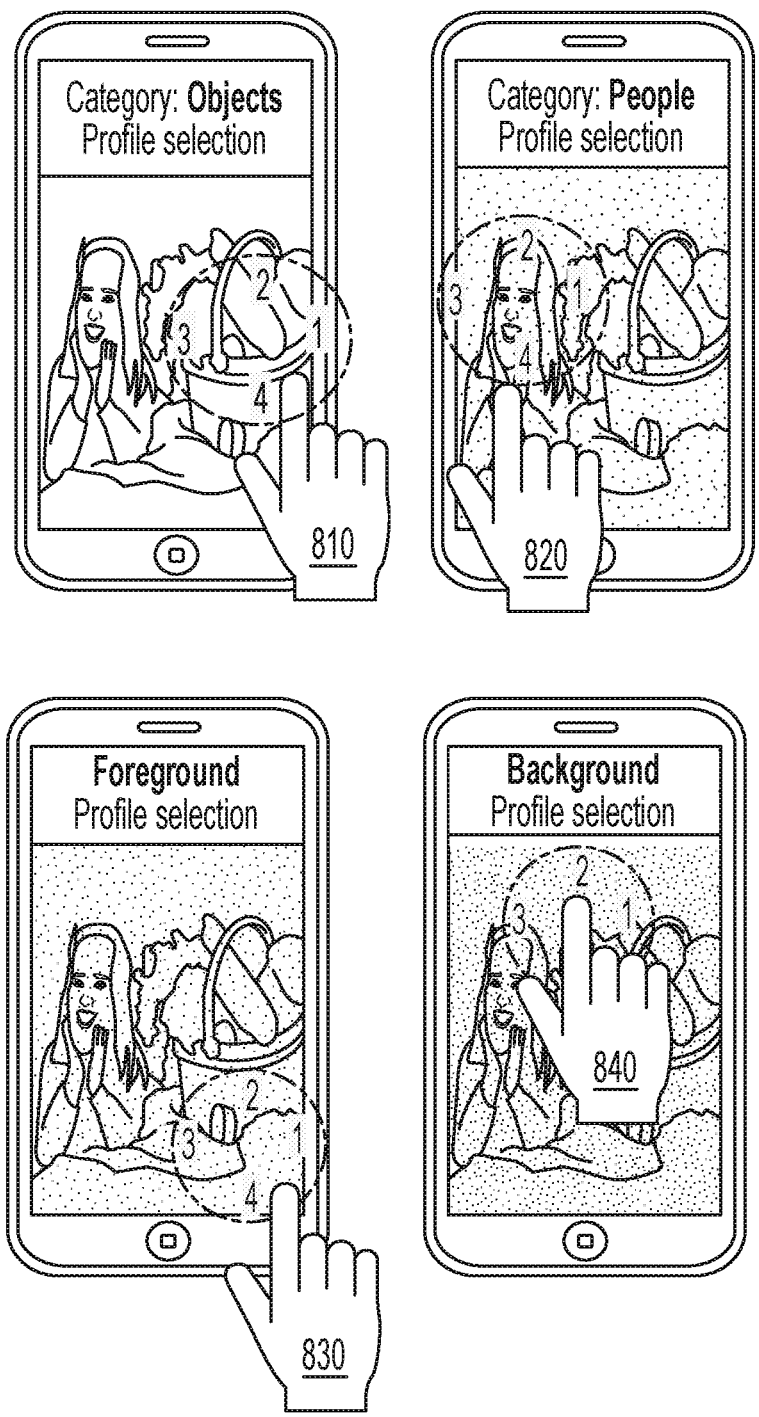
FIG. 8 is a diagram of a method for setting parameter settings of an ISP based on a user input to a region of an image according to an embodiment.

FIG. 8 is a diagram of a method for setting parameter settings of an ISP based on a user input to a region of an image according to an embodiment. As shown in FIG. 8, a user may perform various touch gestures in association with different regions of the UI 360 in order to set parameter settings of the ISP 330.

The user may perform a touch gesture in association with a region of the image displayed via the display 370. The processor 310 may determine the selected region based on the tough gesture, and determine a category that is associated with the selected region.

For example, the user may perform a touch gesture in association with an object (e.g., a food basket) included in the image. Based on the touch gesture, the processor 310 may control the display 370 to display a UI icon for setting the parameter settings of the ISP 330. Further, the processor 310 may determine that the selected region corresponds to a particular category (e.g., "Objects"). The user may perform a user selection 810 using the UI 360 to select the fourth parameter settings for the category. Based on the user selection 810, the processor 310 may set the parameter settings of the ISP 330 to the fourth parameter settings for the category.

As further shown in FIG. 8, the user may perform a touch gesture in association with another object (e.g., a child) included in the image. Based on the touch gesture, the processor 310 may control the display 370 to display a UI icon for setting the parameter settings of the ISP 330. Further, the processor 310 may determine that the selected region corresponds to a particular category (e.g., "People"). The user may perform a user selection 820 using the UI 360 to select the fourth parameter settings for the category. Based on the user selection 820, the processor 310 may set the parameter settings of the ISP 330 to the fourth parameter settings for the category.

As further shown in FIG. 8, the user may perform a touch gesture in association with another object (e.g., a foreground of the image) included in the image. Based on the touch gesture, the processor 310 may control the display 370 to display a UI icon for setting the parameter settings of the ISP 330. Further, the processor 310 may determine that the selected region corresponds to a particular category (e.g., "Foreground"). The user may perform a user selection 830 using the UI 360 to select the fourth parameter settings for the category. Based on the user selection 830, the processor 310 may set the parameter settings of the ISP 330 to the fourth parameter settings for the category.

As further shown in FIG. 8, the user may perform a touch gesture in association with another object (e.g., a background of the image) included in the image. Based on the touch gesture, the processor 310 may control the display 370 to display a UI icon for setting the parameter settings of the ISP 330. Further, the processor 310 may determine that the selected region corresponds to a particular category (e.g., "Background"). The user may perform a user selection 840 using the UI 360 to select the second parameter settings for the category. Based on the user selection 840, the processor 310 may set the parameter settings of the ISP 330 to the fourth parameter settings for the category.

In this way, the user may perform various touch gestures in association with different regions of the displayed image in order to set parameter settings for categories corresponding to the different regions.

Figure 9:
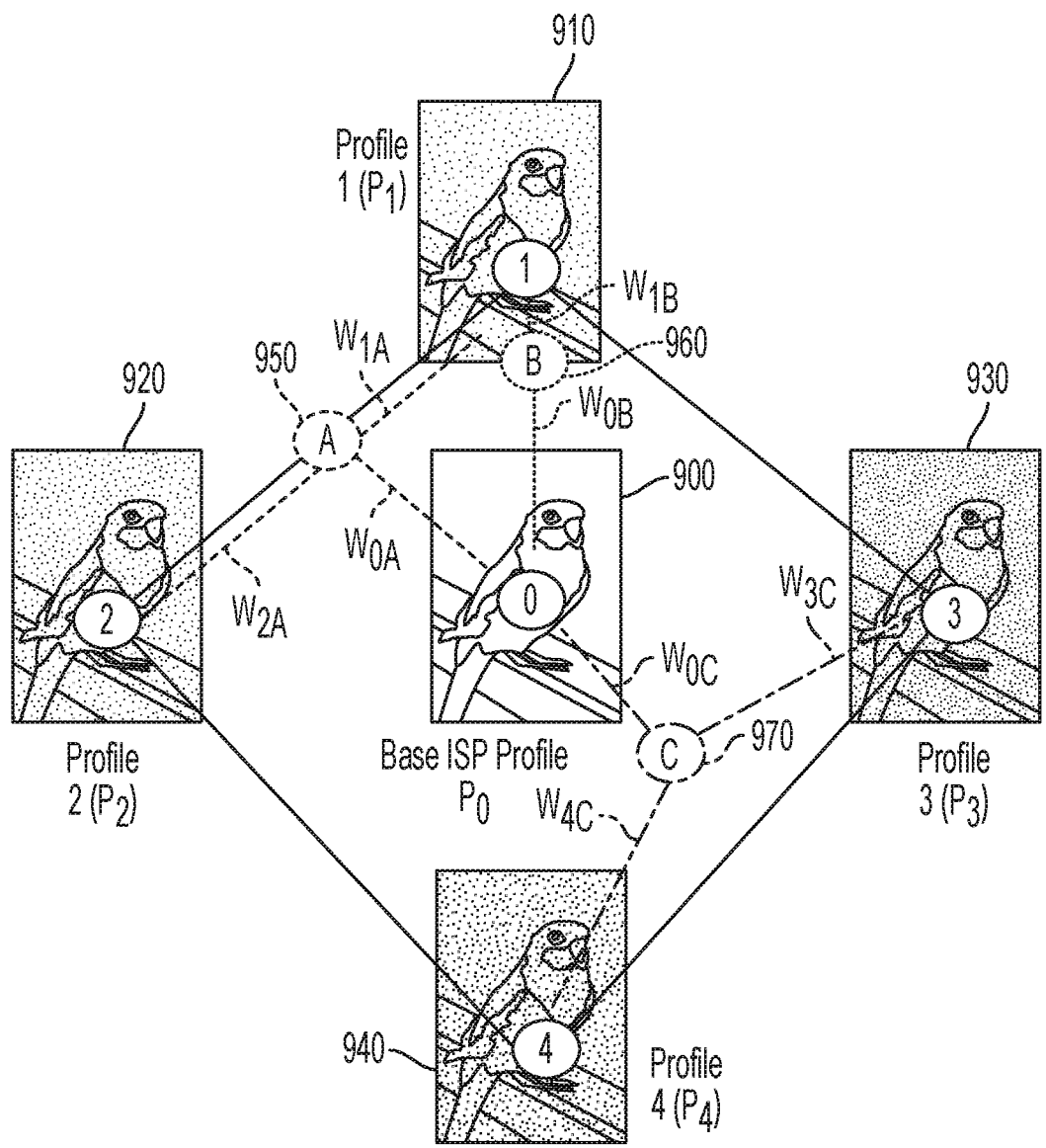
FIG. 9 is a diagram of a method for setting parameter settings of an ISP based on a position of a user selection according to an embodiment.

FIG. 9 is a diagram of a method for setting parameter settings of an ISP based on a position of a user selection according to an embodiment. The processor 310 may control the display to display a base image 900, a first image 910, a second image 920, and a fourth image 940.

The base image 900 may be associated with base parameter settings ("$P_0$"), the first image 910 may be associated with first parameter settings ("$P_1$"), the second image 920 may be associated with second parameter settings ("$P_2$"), the third image 930 may be associated with third parameter settings ("$P_3$"), and the fourth image 940 may be associated with fourth parameter settings ("$P_4$").

The processor 310 may determine selected parameter settings based on a position of the user selection in relation to n displayed images, the parameter settings (e.g., "$P_0$," "$P_1$," "$P_2$," . . . "$P_n$") of the n displayed images, and a function. The function may refer to any type of function that dictates the extent to which parameter settings of a displayed image affect the selected parameter settings. For example, the function may be a function that assigns particular weights to the parameter settings. The function may assign more weight to parameter settings that are associated with an image that is closer to the position of the user selection than as compared to parameter settings that are associated with an image that is farther from the position of the user selection. Although particular examples are used herein, it should be understood that the mobile device 210 may determine selected parameter settings using other types of functions, equations, etc.

The user may perform a touch gesture in association with a particular region of the UI 360. Based on the position of the touch gesture, the processor 310 may determine selected parameter settings. For example, the user may perform a user selection 950 ("A") that is positioned between the base image 900, the first image 910, and the second image 920. Based on the position of the user selection 950, the processor 310 may determine selected parameter settings.

As an example, the processor 310 may determine selected parameter settings using the following equation:

$$P_A = \frac{(w_{all} - w_{0A})}{w_{all}} P_0 + \frac{(w_{all} - w_{1A})}{w_{all}} P_1 + \frac{(w_{all} - w_{2A})}{w_{all}} P_2$$

Referring to the above equation, "$P_A$" may refer to the selected parameter settings, "$P_0$" may refer to the parameter settings of the base image 900, "$P_1$" may refer to the parameter settings of the first image 910, and "$P_2$" may refer to the parameter settings of the second image 920. Further, "$W_{oA}$" may refer to a weight value that corresponds to a distance between the base image 900 and the user selection 950, "$W_{1A}$" may refer to a weight value that corresponds to a distance between the first image 910 and the user selection 950, and "$W_{2a}$" may refer to a weight value that corresponds to a distance between the second image 920 and the user selection 950. Further still, "$W_{all}$" may refer to a sum of "$W_{oA}$," "$W_{1A}$," and "$W_{2A}$."

In this way, the processor 310 may determine selected parameter settings ("$P_A$") based on the base parameter settings ("$P_0$"), the first parameter settings ("$P_1$"), and the second parameter settings ("$P_2$"). Further, in this way, the processor 310 may determine a position of the user selection 950 in relation to the displayed images 900, 910, and 920; and assign weights to the base parameter settings ("$P_0$"), the first parameter settings ("$P_1$"), and the second parameter settings ("$P_2$") based on the position. In other words, the proximity of the user selection in relation to a displayed image affects the extent to which the selected parameter settings resemble the parameter settings of the displayed image.

The base parameter settings ("$P_0$"), the first parameter settings ("$P_1$"), and the second parameter settings ("$P_2$") may include substantially similar weight values because the user selection 950 is positioned nearly equidistant from each of the base image 900, the first image 910, and the second image 920.

As further shown in FIG. 9, the user may perform a user selection 960 ("B") that is positioned between the base image 900 and the first image 910. Based on the position of the user selection 960, the processor 310 may determine selected parameter settings. As an example, the processor 310 may determine selected parameter settings using the following equation:

$$P_B = \frac{(w_{all} - w_{0B})}{w_{all}} P_0 + \frac{(w_{all} - w_{1B})}{w_{all}} P_1$$

Referring to the above equation, "$P_B$" may refer to the selected parameter settings, "$P_0$" may refer to the parameter settings of the base image 900, and "$P_1$" may refer to the parameter settings of the first image 910. Further, "$W_{oB}$" may refer to a weight value that corresponds to a distance between the base image 900 and the user selection 960, and "$W_{1B}$" may refer to a weight value that corresponds to a distance between the first image 910 and the user selection 960. Further still, "$W_{all}$" may refer to a sum of "$W_{oB}$" and "$W_{1B}$."

The base parameter settings ("$P_0$") may include a weight value ("$W_{oB}$") that is less than the weight value ("$W_{1B}$") of the first parameter settings ("$P_1$") because the position of the user selection 960 is closer to the first image 910 than as compared to the base image 900. In this way, the selected parameter settings ("$P_B$") may more closely resemble the first parameter settings than as compared to the base parameter settings ("$P_0$").

As further shown in FIG. 9, the user may perform a user selection 970 ("C") that is positioned between the base image 900, the third image 930, and the fourth image 940. Based on the position of the user selection 970, the processor 310 may determine selected parameter settings. As an example, the processor 310 may determine selected parameter settings using the following equation:

$$P_C = \frac{(w_{all} - w_{0C})}{w_{all}} P_0 + \frac{(w_{all} - w_{3C})}{w_{all}} P_3 + \frac{(w_{all} - w_{4C})}{w_{all}} P_4$$

Referring to the above equation, "$P_C$" may refer to the selected parameter settings, "$P_0$" may refer to the parameter settings of the base image 900, "$P_3$" may refer to the parameter settings of the third image 930, and "$P_4$" may refer to the parameter settings of the fourth image 940. Further, "$W_{oC}$" may refer to a weight value that corresponds to a distance between the base image 900 and the user selection 970, "$W_{3C}$" may refer to a weight value that corresponds to a distance between the third image 930 and the user selection 970, and "$W_{4C}$" may refer to a weight value that corresponds to a distance between the fourth image 940 and the user selection 970. Further still, "$W_{all}$" may refer to a sum of "$W_{oC}$," "$W_{3C}$," and "$W_{4C}$."

In this way, the mobile device 210 may determine selected parameter settings based on a position of a user selection in relation to displayed images.

Figure 10:
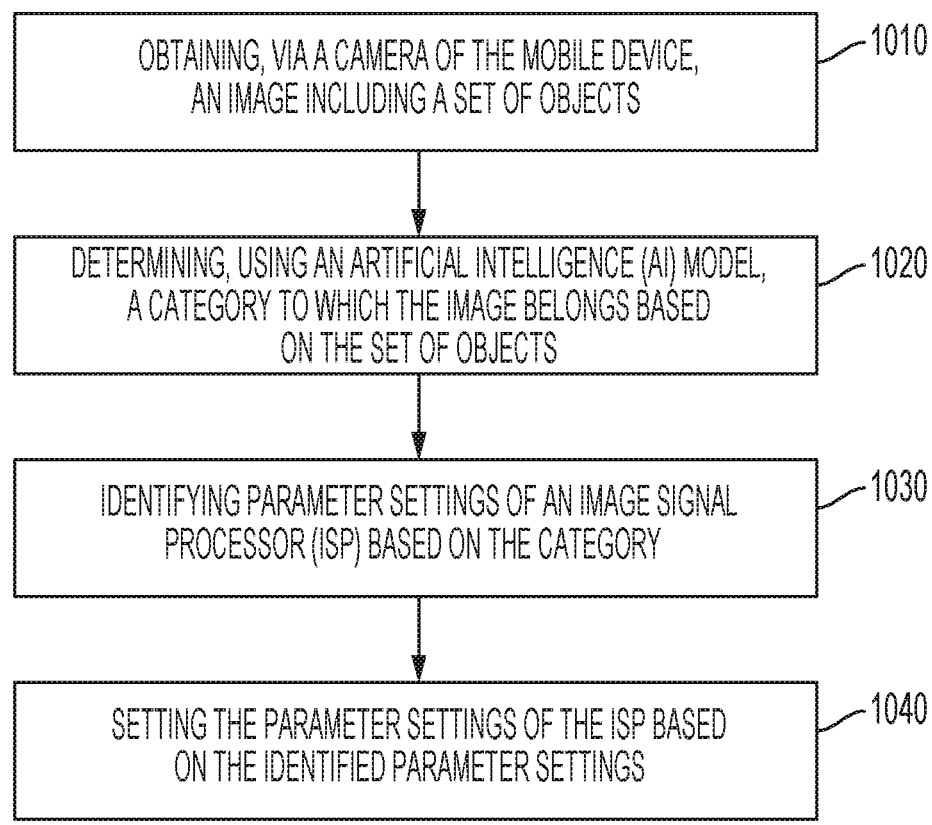
FIG. 10 is a diagram of a flowchart of a method for setting parameter settings of an ISP based on an artificial intelligence (AI) model.

FIG. 10 is a diagram of a flowchart of a method for setting parameter settings of an ISP based on an artificial intelligence (AI) model.

As shown in FIG. 10, the method may include obtaining, via a camera of the mobile device, an image including a set of objects (operation 1010). For example, the camera 320 of the mobile device 210 may obtain an image including a set of objects. The mobile device 210 may obtain the image based on a user interaction with the camera 320, such as the user capturing an image of a scene. The image may include a set of objects, such as people, items, food, landscape features, etc.

As further shown in FIG. 10, the method may include determining, using an artificial intelligence (AI) model, a category to which the image belongs based on the set of objects (operation 1020). For example, the processor 310 may determine, using an AI model, a category to which the image belongs based on the set of objects.

For example, the mobile device 210 may use an AI model to identify an object in the image, determine what the object is, and determine a category to which the object belongs. The AI model may be a model that is trained to identify an object in the image, determine what the object is, and determine a category to which the object belongs. The AI model may be trained using machine learning techniques, such as heuristics, support vector machines (SVMs), neural networks, Markov decision processes, image processing, object detection, computer vision, and the like.

The mobile device 210 may receive the AI model from the server 220. Further, the mobile device 210 may provide feedback information to the server 220 to permit the AI model to be updated.

The mobile device 210 may, using the AI model, identify a set of objects in the image, determine what the objects are, and determine respective categories of the objects. Based on the respective categories of the objects, the mobile device 210 may identify parameter settings of the ISP 330, as described below.

As further shown in FIG. 10, the method may include identifying parameter settings of an image signal processor (ISP) based on the category (operation 1030). For example, the processor 310 may identify parameter settings of the ISP 330 based on the category.

The mobile device 210 may store setting information that maps a category and parameter settings of the ISP 330. For example, the setting information may map a first category (e.g., food) with first parameter settings of the ISP 330, map a second category (e.g., people) with second parameter settings of the ISP 330, and map an n-th category (e.g., landscapes) with n-th parameter settings of the ISP 330. The mobile device 210 may update or configure the setting information based on user selections, such as described in operations 430 and 440 of FIG. 4.

As further shown in FIG. 10, the method may include setting the parameter settings of the ISP based on the identified parameter settings (operation 1040). For example, the processor 310 may set the parameter settings of the ISP 330 based on the identified parameter settings.

In this way, the ISP 330 may process the raw image including the set of objects from the image sensor 340 using the parameter settings. The mobile device 210 may cause the ISP 330 to process the raw image using different parameter settings for the different objects and categories in the image. For example, the ISP 330 may process a first image region using first parameter settings, process a second image region using second parameter settings, and process an n-th image region using n-th parameter settings.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method for setting color parameter settings of an image signal processor (ISP) of a camera of a mobile device based on a user selection, the method comprising:
   controlling a display of the mobile device to display a predefined set of predefined images, wherein the predefined set of predefined images are mapped with a predefined set of color parameter settings of the ISP that control how the ISP processes a raw image;
   receiving, via a user interface (UI) of the mobile device, the user selection in relation to a predefined image of the predefined set of predefined images;
   determining a position of the user selection in relation to the predefined image and another predefined image of the predefined set of predefined images;
   assigning weights to color parameter settings corresponding to the predefined image and the another predefined image, according to distances between the position of the user selection and corresponding positions of the predefined image and the another predefined image;
   determining user-selected color parameter settings of the ISP based on the weights assigned to the color parameter settings corresponding to the predefined image and the another predefined image, based on the mapping between the predefined set of predefined images and the predefined set of color parameter settings; and
   setting the color parameter settings of the ISP, based on the user-selected color parameter settings, to permit the ISP to process the raw image from an image sensor of the mobile device using the user-selected color parameter settings.

2. The method of claim 1, further comprising:
   controlling the display to display an icon that permits a user to transition between the predefined set of predefined images.

3. The method of claim 1, further comprising:
   controlling the display to simultaneously display the predefined set of predefined images.

4. The method of claim 1, wherein the setting the color parameter settings of the ISP comprises setting the color parameter settings of the ISP for a category of images.

5. The method of claim 1, wherein the setting the color parameter settings of the ISP comprises setting the color parameter settings of the ISP for a combination of categories of images.

6. The method of claim 1, further comprising:
receiving, via the UI, another user selection that adjusts the color parameter settings that are associated with the predefined image; and
setting the color parameter settings of the ISP based on the adjusted color parameter settings.

7. The method of claim 1, further comprising:
setting the color parameter settings of the ISP for a plurality of categories of images.

8. The method of claim 1, wherein the assigning of the weights to the color parameter settings corresponding to the predefined image and the another predefined image comprises:
assigning a first weight to the color parameter settings corresponding to the predefined image; and
assigning a second weight to the color parameter settings corresponding to the another predefined image,
wherein the first weight is greater than the second weight when a first distance between the position of the user selection and the corresponding position of the predefined image exceeds a second distance between the position of the user selection and the corresponding position of the another predefined image, and
wherein the first weight is less than or equal to the second weight when the first distance does not exceed the second distance.

9. The method of claim 1, wherein the determining of the user-selected color parameter settings of the ISP comprises:
calculating a weighted average of the color parameter settings corresponding to the predefined image and the another predefined image, based on the weights assigned to the color parameter settings corresponding to the predefined image and the another predefined image; and
determining the weighted average of the color parameter settings as the user-selected color parameter settings of the ISP.

10. A mobile device comprising:
a camera comprising an image signal processor (ISP);
a memory configured to store instructions; and
a processor configured to execute the instructions to:
control a display of the mobile device to display a predefined set of predefined images, wherein the predefined set of predefined images are mapped with a predefined set of color parameter settings of the ISP that control how the ISP processes a raw image;
receive, via a user interface (UI) of the mobile device, a user selection in relation to a predefined image of the predefined set of predefined images;
determine a position of the user selection in relation to the predefined image and another predefined image of the predefined set of predefined images;
assign weights to color parameter settings corresponding to the predefined image and the another predefined image, according to distances between the position of the user selection and corresponding positions of the predefined image and the another predefined image;
determine user-selected color parameter settings of the ISP based on the weights assigned to the color parameter settings corresponding to the predefined image, based on the mapping between the predefined set of predefined images and the predefined set of color parameter settings; and
set color parameter settings of the ISP, based on the user-selected color parameter settings, to permit the ISP to process the raw image from an image sensor of the mobile device using the user-selected color parameter settings.

11. The mobile device of claim 10, wherein the processor is further configured to:
control the display to display an icon that permits a user to transition between the predefined set of predefined images.

12. The mobile device of claim 10, wherein the processor is further configured to:
control the display to simultaneously the predefined set of predefined images.

13. The mobile device of claim 10, wherein the processor is further configured to set the color parameter settings of the ISP for a category of images.

14. The mobile device of claim 10, wherein the processor is further configured to set the color parameter settings of the ISP for a combination of categories of images.

15. The mobile device of claim 10, wherein the processor is further configured to:
receive, via the UI, another user selection that adjusts the color parameter settings that are associated with the predefined image; and
set the color parameter settings of the ISP based on the adjusted color parameter settings.

16. The mobile device of claim 10, wherein the processor is further configured to:
set the color parameter settings of the ISP for a plurality of categories of images.

17. The mobile device of claim 10, wherein the processor is further configured to:
assign a first weight to the color parameter settings corresponding to the predefined image; and
assign a second weight to the color parameter settings corresponding to the another predefined image,
wherein the first weight is greater than the second weight when a first distance between the position of the user selection and the corresponding position of the predefined image exceeds a second distance between the position of the user selection and the corresponding position of the another predefined image, and
wherein the first weight is less than or equal to the second weight when the first distance does not exceed the second distance.

18. The mobile device of claim 10, wherein the processor is further configured to:
calculate a weighted average of the color parameter settings corresponding to the predefined image and the another predefined image, based on the weights assigned to the color parameter settings corresponding to the predefined image and the another predefined image; and
determine the weighted average of the color parameter settings as the user-selected color parameter settings of the ISP.

19. A non-transitory computer-readable medium storing instructions, the instructions comprising: one or more instructions that, when executed by one or more processors of a mobile device, cause the one or more processors to:
control a display of the mobile device to display a predefined set of predefined images, wherein the predefined set of predefined images are mapped with a predefined set of color parameter settings of an image signal processor (ISP) of a camera of the mobile device that control how the ISP processes a raw image;

receive, via a user interface (UI) of the mobile device, a user selection in relation to a predefined image of the predefined set of predefined images;

determine a position of the user selection in relation to the predefined image and another predefined image of the predefined set of predefined images;

assign weights to color parameter settings corresponding to the predefined image and the another predefined image, according to distances between the position of the user selection and corresponding positions of the predefined image and the another predefined image;

determine user-selected color parameter settings of the ISP based on the weights assigned to the color parameter settings corresponding to the predefined image, based on the mapping between the predefined set of predefined images and the predefined set of color parameter settings; and set color parameter settings of the ISP, based on the user-selected color parameter settings, to permit the ISP to process the raw image from an image sensor of the mobile device using the user-selected color parameter settings.

20. The non-transitory computer-readable medium of claim 19, wherein the instructions further cause the one or more processors to:

control the display to display an icon that permits a user to transition between the predefined set of predefined images.

* * * * *